United States Patent

Huffman

[19]

[11] Patent Number: 5,870,711
[45] Date of Patent: Feb. 9, 1999

US005870711A

[54] METHOD AND SYSTEM FOR MANAGEMENT OF CARGO CLAIMS

[75] Inventor: Donald Huffman, Hickory Creek, Tex.

[73] Assignee: Sabre Properties, Inc., Ft. Worth, Tex.

[21] Appl. No.: 570,236

[22] Filed: Dec. 11, 1995

[51] Int. Cl.[6] .......................... G06F 17/60; G06F 153/00
[52] U.S. Cl. ................................ 705/8; 705/28; 705/4; 235/376; 235/384; 235/385
[58] Field of Search .................. 705/1, 2, 3, 4, 705/5, 6, 7, 8, 11, 16, 17, 21, 22, 23, 24, 28, 29, 30, 32, 35, 38, 39, 40, 42, 44, 45; 235/375, 376, 377, 378, 384, 385; 707/1, 2, 7, 8, 10, 200, 205; 395/200.3, 200.34, 200.36, 200.37

[56] References Cited

U.S. PATENT DOCUMENTS

| | | | |
|---|---|---|---|
| 4,491,725 | 1/1985 | Pritchard | 395/202 |
| 4,858,121 | 8/1989 | Barber et al. | 395/202 |
| 5,051,565 | 9/1991 | Wolfram | 235/384 |
| 5,140,518 | 8/1992 | Ema | 128/653.1 |
| 5,168,444 | 12/1992 | Cukor et al. | 395/201 |
| 5,225,990 | 7/1993 | Bunce et al. | 364/478.14 |
| 5,235,702 | 8/1993 | Miller | 395/613 |
| 5,299,116 | 3/1994 | Owens et al. | 705/28 |
| 5,307,262 | 4/1994 | Ertel | 395/202 |
| 5,313,052 | 5/1994 | Watanabe et al. | 235/375 |
| 5,359,509 | 10/1994 | Little et al. | 395/202 |
| 5,401,944 | 3/1995 | Bravman et al. | 235/375 |
| 5,446,740 | 8/1995 | Yien et al. | 395/200.77 |
| 5,485,396 | 1/1996 | Nicholls et al. | 364/491 |
| 5,491,637 | 2/1996 | Kraemer et al. | 364/468.22 |

OTHER PUBLICATIONS

Dialog File 621, Acc. No. 00487868: News Release: Dateline: New York, NY "Sigma Ships OmniDesk Version 2.21", Apr. 18, 1994.

Primary Examiner—Joseph Thomas
Attorney, Agent, or Firm—Finnegan, Henderson, Farabow, Garrett & Dunner

[57] ABSTRACT

The method and system allow a carrier of cargo to effectively manage a system to process customer cargo claims. The method and system utilize a computer, a storage medium, and programing to organize incoming information, store the information in memory, and assign the folders to various workflow queues in order to process the claim. This system and method allow additional information to be input at any point and allows retrieval of any information previously input on any claim. The system has the ability to interface with existing data systems to optimize the performance of the system for claim processing

31 Claims, 12 Drawing Sheets

METHOD AND SYSTEM FOR MANAGEMENT OF CARGO CLAIMS

TECHNICAL FIELD OF THE INVENTION

This invention relates in general to a method and system for management of cargo claims, and more particularly, to an improved method and system for analyzing, processing, tracking and reporting cargo claims made to a cargo carrier.

BACKGROUND OF THE INVENTION

The high volume of cargo transported in today's marketplace has created demand for quick and accurate resolution of a customer's claim that the customer's cargo has been lost or damaged. Managing a cargo claim can include documenting the claim, deciding how to process the claim, controlling what remains to be done on a claim, managing the various stages the claim goes through, sending information to and receiving information from both the customer and other stations in the carrier's company, deciding whether to pay or deny a claim, creating checks and other types of credits for claim settlement, and tracking cost recovery from responsible parties. A cargo carrier must accurately track and rapidly process cargo claims in order to maintain good customer relations and contain costs.

The high number of customer cargo claims has required carriers to create large volumes of correspondence and documentation in paper form when processing these claims. Present manual cargo claims management systems require managing large volumes of paper, creating tracking and management problems during the resolution of the claims. A manual system does not contain an automated control system or an automated audit trail.

In a manual cargo claim system, it is difficult to tell quickly and easily if the claim is being properly processed because the claim file must be manually reviewed. No automated system exists to determine what information still needs to be received to begin processing a claim. Requests for information about a claim from customers and from other stations in the claims management system must be manually tracked to ensure the information is later received. Since a manual system has no automatic prompt, a request for information could be sent out and the claim file could subsequently sit in a cabinet and wait for a number of days, weeks or months for a response to return. Manual claims management systems typically do not track whether the information was returned or how long the claim file sat awaiting responses to requests for information. In a paper-driven system, no single person or group of persons understood the status of each particular folder. This can lead to customer frustration, because processing the claim may take a considerable amount of time.

Further customer dissatisfaction can occur because the customer service representative typically cannot quickly and accurately determine the status of a customer's claim. When a customer calls, the customer representative must typically make the customer wait for an answer because the representative must locate the file, physically retrieve the file, determine the status of the claim and then return the customer's call. The inability to immediately tell the customer the status of the claim in question can strain the customer relationship.

Frustration can also occur on the part of the customer representative when trying to satisfy the customer's requests. A customer might, over several phone calls, talk to several different customer representatives. Each time the claim folder must be moved to the customer representative speaking to the customer. Also, the customer's file may have moved to a different physical location for further processing. This leads to constant searches for the information and folder. This can be frustrating for both the customer service representative as well as the customer.

Also in a manual system, communication between departments of a cargo claims management system are often slow and time-consuming. Letters to customers in a manual claims management system must be manually generated.

In a manual system, only one person can have access to a physical paper claim file at any one time. Because of the limitations of a physical file, even though some stages of the claims process can happen concurrently if multiple persons had access to the file, only one person can be processing the claim at a time.

Due to work space considerations, physical paper files of claims must sometimes be archived. Once a paper copy file for a claim is archived, it must be retrieved when it becomes necessary to further process the claim.

Furthermore, a manual claim management systems typically does not track the average time required to process a claim or the average time required at each step of the claim processing cycle. Factors such as staffing, work load, claim processing time, and time from customer complaint to resolution of the claim, could not be determined with accuracy because there was no system or method to track this data in a manual claims management system.

Also in a manual claims management, the folder or the information contained within the folder could and did get lost or misplaced. Once lost, the information contained in the claim folder would have to manually reproduced from the beginning of the process. Sometimes this information was irretrievable. If a folder was merely misplaced, as new information came in relating to that folder, the information would either lay in loose form outside of the proper claim folder, or a new folder might be opened, creating the problem of trying to track two folders for the same claim.

An improved cargo claims management method and system would increase cargo claim processing productivity and provide consistency in servicing customers who have made cargo claims.

SUMMARY OF THE INVENTION

A need has arisen for an automated method and system for cargo claim management that reduces the volume of paperwork associated with cargo claim management, creates a control system tracking both information and time spent gathering particular information or working the claim, allows immediate access to the information by the customer representatives, allows customer representatives to easily communicate both internally and externally about the claim, tracks the status of whether claims have been paid and whether the costs associated with paid claim can be recovered from outside parties, has the ability to automatically generate correspondence to customers and input information requested by the correspondence, stores information in a central location that can be remotely accessed, allows multiple people to access a claim folder, reduces or eliminates the incidents of lost and misfiled folders and information contained within folders, reduces or eliminates the time spent searching for lost or misplaced folders, reduces or eliminates the time spent recovering files from physical archives, simplifies the process of archiving files, and generally improves the customer relationship.

In accordance with the present invention, a claims management method and system are provided that substantially eliminate or reduce the disadvantages associated with previously developed claims management systems.

The cargo claims management method and system can utilize a computer, storage medium and software programming to receive information about said cargo claims from any number of external sources, organize the information within the system by indexing the information into computerized folders, each folder corresponding to an individual cargo claim. These external sources can include paper documents, magnetic tape files, software files, and electronic data via modem. The information in these folders is stored in a central memory. The folder is stored in one of the workflow queues depending on the status of that folder and allows users to manipulate the information within the folders to further process the cargo claim.

Technical advantages of the present invention include the increased speed and efficiency inherent in an automated system, the reduction of the volume of paper created in managing cargo claims, and the creation of a control system and audit system. After the initial information is input, the system automatically checks to determine if all information needed has been input, and flags the file for processing as soon as all the necessary information is received. The present invention tracks the status of any cargo claim throughout its life cycle and allows a user to quickly evaluate what further functions need to be performed on any particular claim in order to further process it. The system improves customer response time because the customer service representative has the entire folder for any claim immediately available when taking a customer's call and can immediately report on the status of that claim or request any outstanding information. All the information is stored in a central location which can be remotely accessed by a number of persons who can view or enter information as needed. The present invention also serves as a communication system allowing the various claims processors to communicate more rapidly amongst themselves. The present invention also allows for archived files to be located nearly as rapidly as active files and eliminates the need to retrieve a paper file from an off-site storage facility. The present invention also automatically generates letters based on what information the user requires to be sent to the customer. The cargo claim management system also creates a report describing how long each claim has spent at each workstation and how long it took to process each claim. The claims management system allows the users to request payment of a claim, authorize payment of a claim, and print the check or otherwise credit the customer's account for that claim. The present invention also creates an accounting report describing claims paid and claims recoverable from an outside party.

The present invention improves the overall processing time of cargo claims and results in increased customer satisfaction.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 6 illustrates an embodiment of the user interface screen provided when accessing the AMS subsystem;

FIG. 7 illustrates an embodiment of the user interface screen provided when accessing the CLAIMS subsystem;

FIG. 8 illustrates an embodiment of the user interface screen provided when accessing the CLOSING subsystem;

FIG. 10 illustrates an embodiment of the user interface screen provided when accessing the CHECKS subsystem;

DETAILED DESCRIPTION OF THE INVENTION

An embodiment of the present invention is illustrated in the Figures, like numerals being used to refer to like and corresponding parts of the various drawings.

A method and system for managing cargo claims typically includes at least one computer processor, a computer program for directing the computer, at least one memory to store both the information processed and the computer program, and at least one input and output device to provide an interface for the user. The claims processing workstations can be set up to accept input from a variety of sources including scanning, imaging and manual data input.

The cargo claims management method and system can utilize a computer, storage medium and software programming to receive information about said cargo claims from any number of external sources, organize the information within the system by indexing the information into computerized folders, each folder corresponding to an individual cargo claim. These external sources can include paper documents, magnetic tape files, software files, and electronic data via modem. The information in these folders is stored in a central memory. The folder is stored in one of the workflow queues depending on the status of that folder and allows users to manipulate the information within the folders to further process the cargo claim.

The workflow queues represent data files from which the users can call up the folder for further processing. The various workflow queues include a setup queue, a hot queue, a suspense queue, a work queue, a pending queue, a complete queue, an other queue, a request payment queue, and a print check queue. The users move the folders through the various workflow queues in order to process a claim. The users access the folders at various workstations. The workstations are screens from which the users can manipulate the data contained within folders and execute certain functions based on the data. The users include the claims representatives, the claims adjusters and the claims managers. Other data files exist in the system including the air bill/claims storage facility, the transaction journal data base, the write-off data base, and the recovery data base.

I. SYSTEM FLOW

Figure 1:
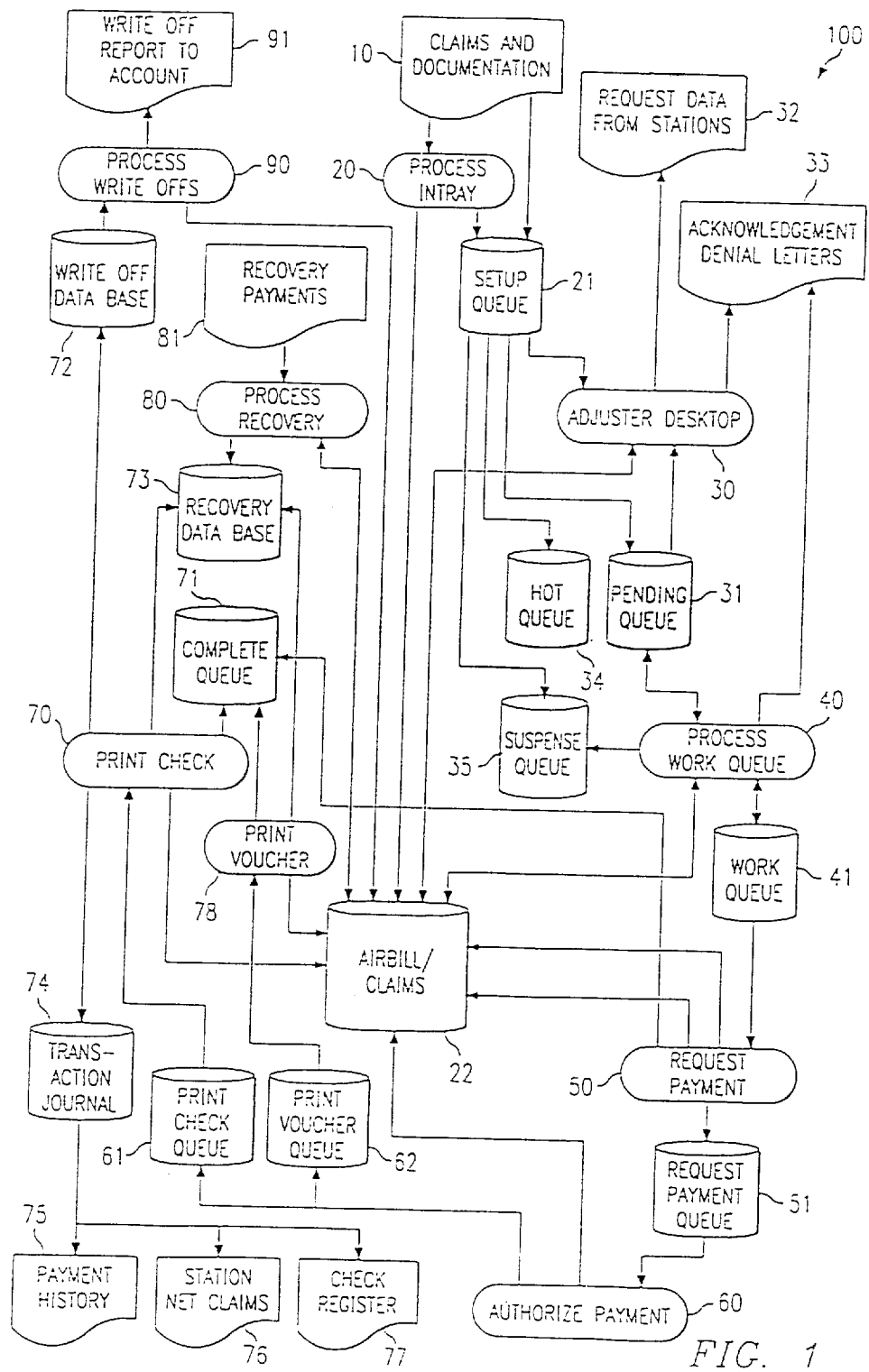
FIG. 1 illustrates a block diagram of the system and method according to the present invention.

The block diagram of the claim management system and method 100 shown in FIG. 1 includes a claims and documentation step 10. The claims and documentation information for a claim can be input to the process intray 20 where the information is processed and placed in the setup queue data file 21 and also stored in the airbills/claims memory storage facility 22. The information from the claims and documentation step 10 could alternatively be manually input to the setup queue data file 21. The adjuster desktop workstation 30 receives data from the setup queue data file 21, sends data to and receives data from the air bill/claims memory storage facility 22 and the pending queue data file 31, and creates requests for data 32 from other stations and customer acknowledgment and denial letters 33. Information and folders can travel between the pending queue data file 31 and the process work queue workstation 40. The process work queue workstation 40 allows a user to retrieve information from both the pending queue data file 31 and the work queue data file 41, to create letters requesting information 33, to transfer information back and forth to the pending queue 31 and the work queue 41 data files, and to store information in the air bill/claims memory storage facility 22. From the process work queue workstation 40, a user can access the work queue data file 41 and create a letter denying the claim as shown in FIG. 1 as the acknowledge denial letters 33. If a claim is not denied, the request payment queue workstation 51 allows a user to retrieve information from the work queue data file 41, place information in the request payment queue data file 51, and send the information to the air bill/claims memory storage 22. The authorize payment workstation 60 receives the information from the request payment queue data file 51 and allows the user to place the information in the print check queue data file 61 and the air bill/claims memory storage 22. The print check workstation 70 receives the information from the print check queue data file 61 and allows the user to place the information into a complete queue data file 71, a write-off data base data file 72, or a recovery data base data file 73. The information will also be stored in a transaction journal data file 74 and the air bill/claims memory storage facility 22. The transaction journal 74 provides a data base from which payment histories 75, net claims from particular stations 76, and check registry information 77 can be extracted. Information stored in the recovery data base 73 will be further processed through the process recovery workstation 80 that tracks recovery payments 81 and places the information in the air bill/claims memory storage facility 22. Information stored in the write off data base 72 will be further processed through the process write offs workstation 90 that tracks write offs reported to accounts 91 and places the information in the air bill/claims memory storage facility 22.

A. Claim Documentation

As shown in FIG. 1, the cargo claim management method and system 100 begins at the claims and claims documentation step 10. The claims processing cycle begins when a claim is received by the claims department. The claim is often a letter stating the customer complaint or a letter stating an intent to file a claim (preliminary claim). These documents are combined with other claimant letters responding to the claims department for more information on a claim or supporting documentation from the processing stations. The information contained in this documentation is input into a computer on the appropriate computer screen. Each screen or partial screen of information becomes a computerized document in the claims management system. The computer documents are indexed and assigned a claim and identification number for the system. In operation, the present invention utilizes a computer, storage medium and software programming to create a computerized folder of all documents related to each cargo claim submitted by the carrier's customers. A computerized claim folder comprises'the documents input to the system on an individual claim throughout the processing of that claim.

B. Process Intray

Generally, the process intray 20 determines the information required in a folder, compares the information received to the information required, and sends the folder to a claims adjuster when all of the required information has been received.

Figure 2:
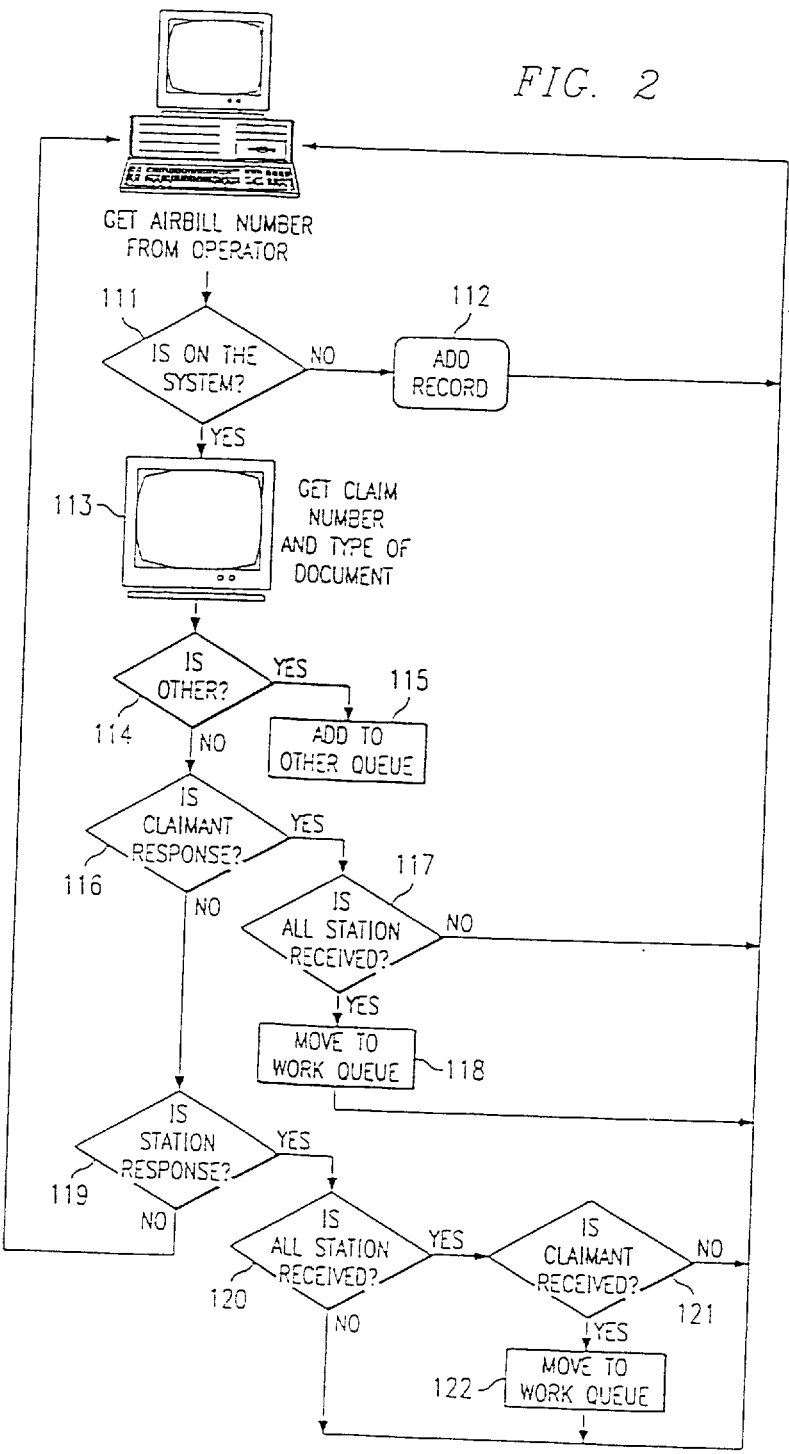
FIG. 2 illustrates a data flow diagram describing the Intray processing.

The process intray 20 steps are shown in FIG. 2 in the form of a flowchart. The process intray 20 first indexes the documents input and determines if a folder on a particular claim has been previously created on the system as shown in FIG. 2 at step 111. If not, the process intray 20 organizes the information into a new folder as shown in step 112. Once the claim information is on the system as a claim folder, the process intray 20 determines the type of document defining the claim and assigns the folder a claim number as shown in step 113. If the operator cannot determine the type of document to be input, the document is added to the other queue as shown in steps 114 and 115 to be classified. The process intray will then determine if the information input was either a claimant's response or a company station's response as shown in steps 116 and 119. The claimant's response would be a response by a customer making a claim to a request for information from the company; a company station's response would be a response to a request for information from a department within the carrier's company. If this is a previously set up folder, once the claimant's response and all station responses have been received, the folder moves to the work queue 41 for further processing as shown in steps 117, 118, 120, 121, and 122. If this was the first document placed into the folder, the process intray 20 would place the folder into the setup queue data file 21 to begin the adjuster process and assigns an adjuster to work the claim.

C. Adjuster Desktop

Once the claim has received the appropriate information, it is assigned to an adjuster for further processing of the claim through the various steps or workstations of the claims management cycle. These workstations are the steps at which the various users can perform functions on the folders, such as inputting information or moving the folder to a different queue, to further process the claim. The adjuster desktop workstation 30 is the first workstation from which the claims adjuster begins processing a claim. The adjuster desktop 30 allows the adjuster to look at his work load on a single computer screen. An adjuster is able to review various queues, determine the overall work load, appraise priorities and move claims from one queue to another. The Queues are: Setup, Hot, Suspense Work, Work, Other, Pending, Suspense, Request Payment, Print Check, and Complete.

The queuing process is unique to this claims management system and provides the backbone of the flow control and management of the system. The queuing process allows the adjuster to place a new claim into a pending queue 31, if necessary, to wait for the receipt of additional data from the claimant or company station. The adjuster can place a claim in a special "Hot Queue" 34 that will mark the claim folder as one that should be addressed quickly. The claim can also be placed into a suspense queue 35 for a specified amount of time before again bringing it to the attention of the adjuster. If a claim is placed into the Pending Queue 31 because the adjuster is waiting on additional data from the claimant or company station, the process intray 20 will automatically move it to the Work Queue 41 when the process intray determines that all the requested data has been received.

From the adjuster desktop workstation 30, the adjuster can setup a claim folder, review the details of a claim folder, have the system automatically calculate the potential liability of the claim, create correspondence, review part or all of the contents of a folder, print a copy of any image on the computer screen from a claim folder, or request the physical claim folder if necessary. In creating correspondence, the claims adjuster has the ability to create a letter and envelope to the customer claimant that will acknowledge the receipt of the claim, request additional data from the claimant, or deny the claim. The claim adjuster can also request additional data from the carrier company's stations. The system cannot only create a letter and envelope to the claimant, but it will also generate copies of letters to carbon copy or blind copy individuals with a unique message to each recipient. This can be done utilizing standard form letters contained within the system or special user created letters. The system also maintains the address list of often-copied recipients in order to reduce the time and effort to create blind or carbon copies.

After the folder has acquired all of the information necessary to process it, the folder is moved to the work queue. The system allows the user to move the folder from queue to queue depending on what needs to be done to further process the cargo claim.

D. Process Work Queue

Once a claim has made it to the work queue data file 41, the adjuster can continue the process of resolving the claim at the process work queue workstation 40. From the process work queue workstation 40, the adjuster can have the system calculate the potential liability of the claim, review any weather-related events that may have led to the filing of the claim, or create an entry into the weather event table for future review. If the adjuster requires more information from the claimant or other company stations, from the process work queue workstation the adjusters can place the folder in a suspense work queue 35 and create a letter requesting this additional information. This function allows the user to request any additional information needed to further process the cargo claim.

At the process work queue workstation 40, the adjuster can decide to close the claim folder by denying the claim. If a claim is denied, the claim folder is moved to the complete queue for archiving, a denial letter 33 is created and sent to the customer, and the claim folder processing is finished. If the adjuster allows a claim, the claim folder is sent to the request for payment queue 51.

E. Request Payment

If a cargo claim has been approved for payment to the customer, the claims management system allows the authorization of payment of the claim in whole or in part. At the request payment workstation 50, the adjuster creates a payment request record that typically requires subsequent authorization by a claims manager. At the time the adjuster makes a payment request, the adjuster has the option to pay the claim with a check or voucher or create a write-off to the claimant's account or credit card. The claim adjuster can also assess all or part of the liability for the claim to another company and move the folder to the recovery data base 73 for recovery processing.

In order to pay the claim, the system can either request a check or a voucher. While the checks are typically used to pay domestic clients, the vouchers are primarily used for overseas payments or for payments over a preset limit.

When a claim is paid, the adjuster must assign liability to each company station that contributed to the damage that resulted in the claim. From the request payment workstation 50, the adjuster can assess liability to an unlimited number of stations on either a percentage or a dollar basis. The system will automatically check the allocation of liability to ensure both that all liability is assessed and that the total liability does not exceed 100 percent.

F. Authorize Payment

The manager of the claims department typically reviews the all requests for payment of claims made by the various claims adjusters from the authorize payment workstation 60. The manager will either accept or deny the adjuster's recommendation; if the claims manager denies the request, the folder is returned to the adjuster. The adjuster can then deny the claim or make another payment request recommendation and send the folder back to the request payment queue 51. If the payment recommendation is accepted, the request is moved to either the print check queue 61 or the voucher queue 62 depending on whether the customer receives a check or voucher for the approved amount.

G. Print Checks and Vouchers

The claims management system allows a user to process payment checks, credit accounts of customers and generate accounting reports based on payments made and received. The system prints checks at the print check workstation 70 for claims in the print check queue 61. The system prints vouchers at the print voucher workstation 78 for claims in the print voucher queue 62.

The system is set up to have consecutively numbered checks for check audit control. Each check is inventoried and accounted for, whether the check is used for printer alignment or for claim payment. The system can reprint checks if the check gets destroyed during printing. When a check is reprinted, the system marks the check in the check inventory as voided for reprint and a new record is created for the new check.

Once a check or voucher is printed the system updates all records of the payment of the claim, including totaling of all claims for a particular weight bill.

If payment of a previously authorized claim is declined after the check is issued, the check can be backed out of all totals updated during the check printing process. This process updates historical and accounting files.

If a claim payment is authorized for voucher, a voucher is printed at the print voucher workstation 78 and must be re-authorized before the system will mark the payment.

After a claim has been paid or moved to the write off data base 72, the adjuster moves the folder to the complete queue 71 and the processing of the customer claim is complete. The claim folder may also be moved to the recovery data base 73 if liability for the claim has been assessed to an outside party.

H. Process Recovery

For any paid claim, the adjuster has the option of assessing liability to an outside company. The process recovery workstation 80 allows the adjusters to track the recovery of paid claims from responsible outside parties. The system creates an inventory of all authorized payments for which liability is assessed to an outside party in the recovery data base 73. The recovery subsystem also tracks all payments made by outside parties and creates a report of any payments made by or liability assessed to outside parties.

I. Process Write Off

When a claim payment is made, the adjuster can utilize the process write off workstation 90 to assign all or part of the payment to a writeoff to the claimant's account or credit card. The system will create a report of all new writeoffs for processing by accounting.

J. Performance Calculation

The claims management system automatically tracks the amount of time each claim spends each particular queue prior to moving to a different queue for further processing. The system calculates the average amount of time claims have remained in each queue. The claims management system provides the ability to compare any particular adjuster's average time processing claims through any queue to the overall average time claim folders remain at that queue. The system can also compare the amount of time any particular claim spent in a particular queue with the average time claims spend in that queue. This can be an excellent management tool to use when determining staffing levels and employee performance.

II. PROGRAMMING SUBSYSTEMS

One embodiment of the claims management system utilizes a computer program with a variety of subsystems for accomplishing the processing of the cargo claims. The subsystems include the MAIN, LETTERS, REPORTS, CLAIMS, AMS, CLOSING, MISC, CHECKS, MAIL, and TABLE MAINTENANCE subsystems.

Figure 3:
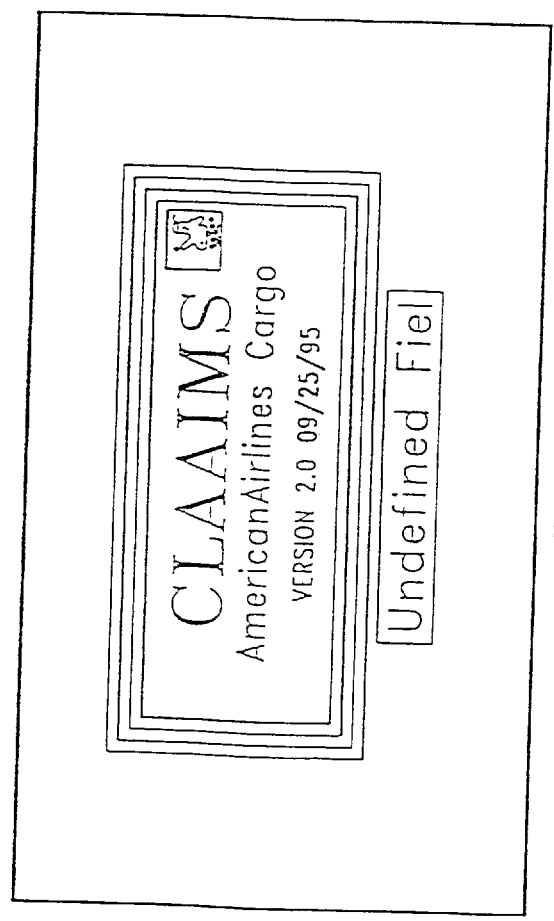
FIG. 3 illustrates an embodiment of the user interface screen provided when accessing the MAIN subsystem.

FIG. 3 illustrates one embodiment of the MAIN subsystem interface screen a user can access at a computer station. AACLAIM.FDL is a form entitled "Main Menu and Beginning Screen" contained in the MAIN subsystem. This screen is the beginning point of the claim management system and contains the main menu that a user accesses to start the claims management system.

Figure 4:
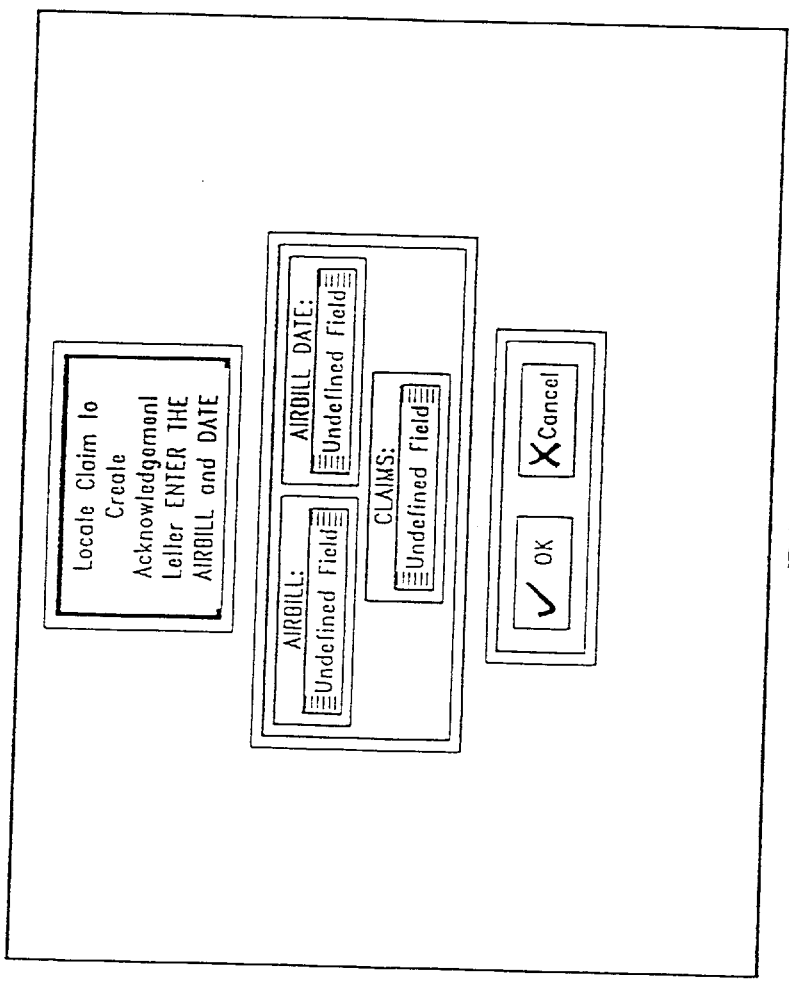
FIG. 4 illustrates an embodiment of the user interface screen provided when accessing the LETTERS subsystem.

FIG. 4 illustrates one embodiment of a LETTERS subsystem interface screen that the user accesses on a computer terminal. The LETTERS subsystem includes a plurality of forms, letters, and reports. The user will access the LETTERS subsystem to create correspondence to customers in to, among other things, acknowledge the receipt of the claim and to request more information from the customer.

ACKADDRS.DB is a table entitled "Acknowledgment Address" contained in the LETTERS subsystem. This table contains the addresses included in the acknowledgment letters.

ACKBCC.DB is a table entitled "Acknowledgment Letter Blind Copy" contained in the LETTERS subsystem. This table contains the addressee and the message within the blind copies of an acknowledgment letters.

ACKBODY.DB is a table entitled "Acknowledgment Letter Body" contained in the LETTERS subsystem. This table contains the body of the acknowledgment letters. These records are retained in the system.

ACKCC.DB is a table entitled "Acknowledgment Carbon Copy" contained in the LETTERS subsystem. This table contains the addresses on the carbon copy of the acknowledgment letters.

ACKCOPY.FDL is a form entitled "Create Carbon Copies and Blind Copies" contained in the LETTERS subsystem. This form is used to create carbon and blind copies. It also allows the user to create special messages to copied parties.

ACKENVEL.DB is a table entitled "Envelope Print File for the Acknowledgment Letters and Copies" contained in the LETTERS subsystem. This file stores print jobs for the envelopes of the acknowledgment letters. This table is emptied by the user when the printing is verified.

ACKENVEL.RDL is a report entitled "Print Envelopes" contained in the LETTERS subsystem. This report allows the printing of the envelopes for letter created.

ACKFORMS.DB is a table entitled "Acknowledgment Letter Standard Forms" contained in the LETTERS subsystem. This table contains all of the standard form acknowledgment letters.

ACKLETIM.RDL is a report entitled "Print Letter Immediately Report" contained in the LETTERS subsystem. This report allows a user to bypass the print queue and print a letter immediately.

ACKLETTR.FDL is a form entitled "Get AWB and Claim to Create a Letter" contained in the LETTERS subsystem. A dialog box to get the AWB and claim to add a letter.

ACKLETTR.RDL is a report entitled "Print Letters" contained in the LETTERS subsystem. This report prints the letters from a query of the ACKPRINT print queue table.

ACKNOWLG.FDL is a form entitled "Create Acknowledgment Letter" contained in the LETTERS subsystem. This is the main form for creating an acknowledgment letter This form allows the use of standard form letters and standard address. This form also has several methods of printing the letter and the envelope.

ACKPHASE.DB is a table entitled "Standard Acknowledgment Phrases" contained in the LETTERS subsystem. This table contains the standard phrases accessible from the acknowledgment system that can be used when writing an acknowledgment letter.

ACKPRINT.DB is a table entitled "Acknowledgment Letter Print Queue" contained in the LETTERS subsystem. This table is the print queue for the acknowledgment letters.

ACKPRTIM.DB is a table entitled "Temporary Letter Print Immediately Queue" contained in the LETTERS subsystem. The user accesses this table to print letters immediately and not put them on the print queue.

ACKPTCTL.FDL is a form entitled "Printer Control of Acknowledgment Letters" contained in the LETTERS subsystem. This form controls the printing of the acknowledgment letters and envelopes.

CLMREQUS.DB is a table entitled "Text for Requesting Data" contained in the LETTERS subsystem. This is a lookup table to request data from a claimant.

GETACKNW.FDL is a form entitled "Get Acknowledgment Letter for a Claim" contained in the LETTERS subsystem. This form is a table of all acknowledgment letters created for a claim. It allows the users to generate an automatic letter without going to the acknowledge form.

PRTACKEN.QBE and PRTACKIM.QBE are queries contained in the LETTERS subsystem. These queries are used to gather and sequence information put into letters.

PRTACKNW.QBE is a query entitled "Queue to Pull Records from ACKPRINT and Print the Record" contained in the LETTERS subsystem. This query is used to pull those records needed for the print queue system.

STDCOPY.DB is a table entitled "Table of Standard Addresses" for Carbon and Blind Copies contained in the LETTERS subsystem. This table of the standard address can be used for carbon/blind copies or letter addresses.

Figure 5:
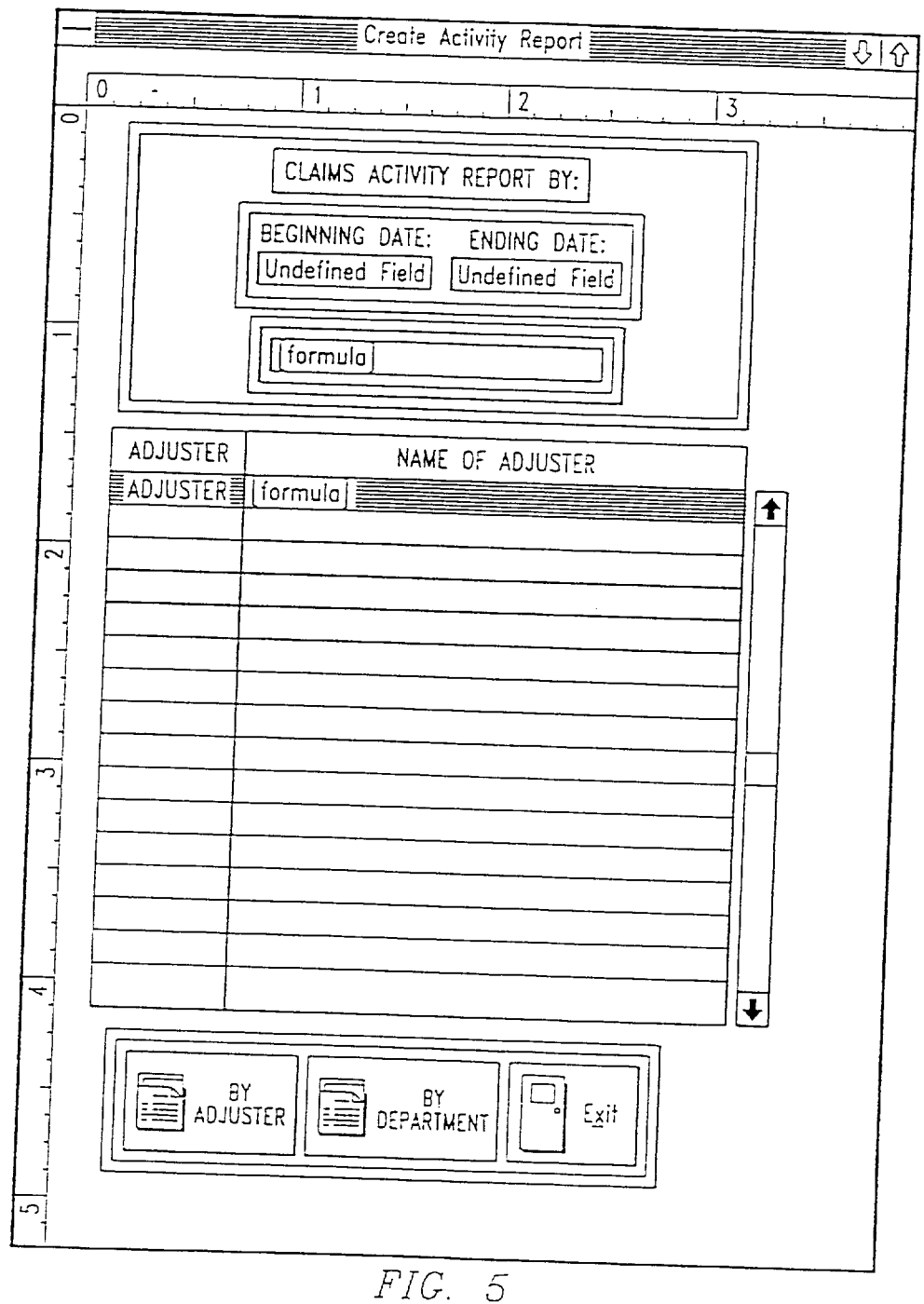
FIG. 5 illustrates an embodiment of the user interface screen provided when accessing the REPORTS subsystem.

FIG. 5 illustrates one embodiment of a REPORTS subsystem interface screen that the user accesses on a computer terminal. The REPORTS subsystem includes a plurality of tables and reports used in creating a variety of reports, including the reports comparing an adjuster's performance to average performance.

ACTERROR.DB is a table entitled "Error Report for the Activity Report" contained in the REPORTS subsystem. This table is used to retain errors that happened during compiling of the adjuster activity report.

ACTIVPRT.DB is a table entitled "Adjuster Activity Report" contained in the REPORTS subsystem. This temporary table contains results of the adjuster activity report.

ACTIVRPT.DB is a table entitled "Adjuster Activity Report Table" contained in the REPORTS subsystem. This is a temporary table for the Adjuster Activity Report.

ACTIVRPT.RDL is a report entitled "Adjuster Activity Report" contained in the REPORTS subsystem. This is a printed version of the Adjuster Activity Report for adjusters.

ACTRPT2.RDL is a report entitled "Adjuster Activity Report—Department" contained in the REPORTS subsystem. This is a copy of the Adjuster Activity Report for the Department.

FOLDERPT.RDL is a report entitled "Folder Request Report" contained in the REPORTS subsystem. This report lists all current requests for folders.

IMPREST.FDL is a form entitled "IMPREST Report" contained in the REPORTS subsystem. Data for the IMPREST report is gathered based on a user entered date range. The report output from the gathered data goes to the IMPREST.RSL report.

QUEERROR.FDL is a form entitled "Form to Report Errors in the Queue and Claim" contained in the REPORTS subsystem. This form is used to look for inconsistency between the claim records and the queues.

QUERROR.RDL is a report entitled "Report of Queue Errors Found" contained in the REPORTS subsystem. This report shows the queue errors.

RPTACTIV.FDL is a form entitled "Adjuster Activity Report Form" contained in the REPORTS subsystem. This form goes into the adjuster activity report.

RPTACTV2.FDL is a form entitled "Form to Display the Adjuster Activity Report" contained in the REPORTS subsystem. This form displays the adjuster activity report to the screen.

Figure 6:
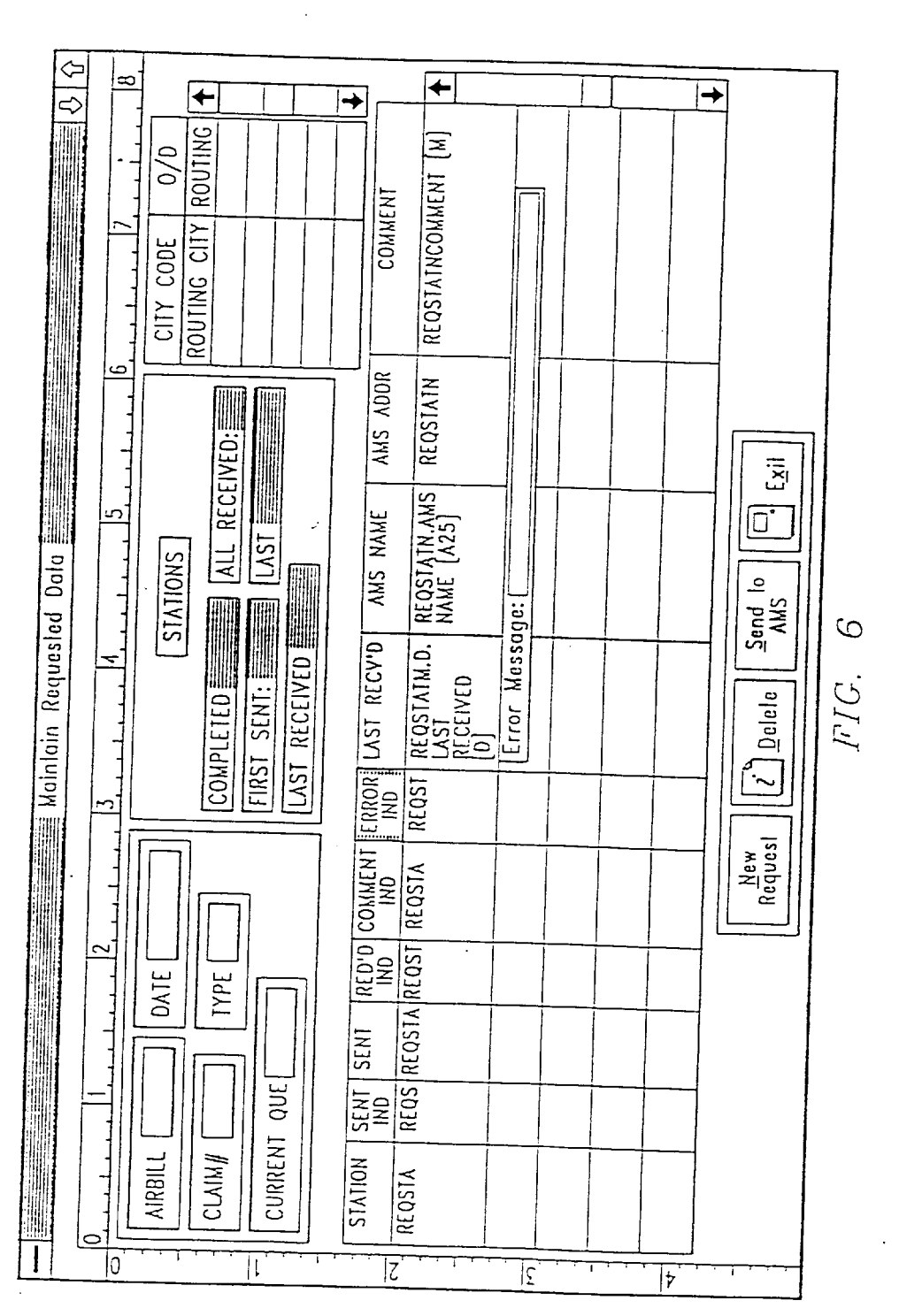

FIG. 6 illustrates one embodiment of an AMS subsystem interface screen that the user accesses on a computer terminal. The AMS subsystem allows the claims management system to interface with existing software programs. The AMS subsystem includes a plurality of forms and tables.

ADJREQST.FDL is a form entitled "Request Data from a Station" contained in the AMS subsystem. This form starts the process to send a message to one of the company stations.

AMSADDRS.DB is a table entitled "AMS Address Table" contained in the AMS subsystem. This table contains the addresses for each AMS message for conversion to a DBASE IV record. This record can be broadcast via a reservation system used to book passage on a carrier. The American Airlines SABRE reservation system is an example of the reservation system over which a broadcast can be made utilizing the present invention.

AMSCONTL.FDL is a form entitled "AMS Control" contained in the AMS subsystem. This form controls the sending and error checking for AMS messages sent via the SABRE interface.

AMSMSG.DB is a table entitled "AMS Message Table" contained in the AMS subsystem. This table contains the message text for each AMS message for conversion to a DBASE IV record followed by broadcast via the SABRE interface.

AMSNAMES.DB is a table entitled "AMS Names and Addresses Table" contained in the AMS subsystem. This table contains the names, addresses and other information for the AMS message system.

AMSRESND.FDL is a form entitled "AMS Rebroadcast Form" contained in the AMS subsystem. This form is used to resend AMS messages for a specified time frame. This form is usually only necessary when a serious error has occurred and stations did not receive messages for that specified time frame.

Figure 7:
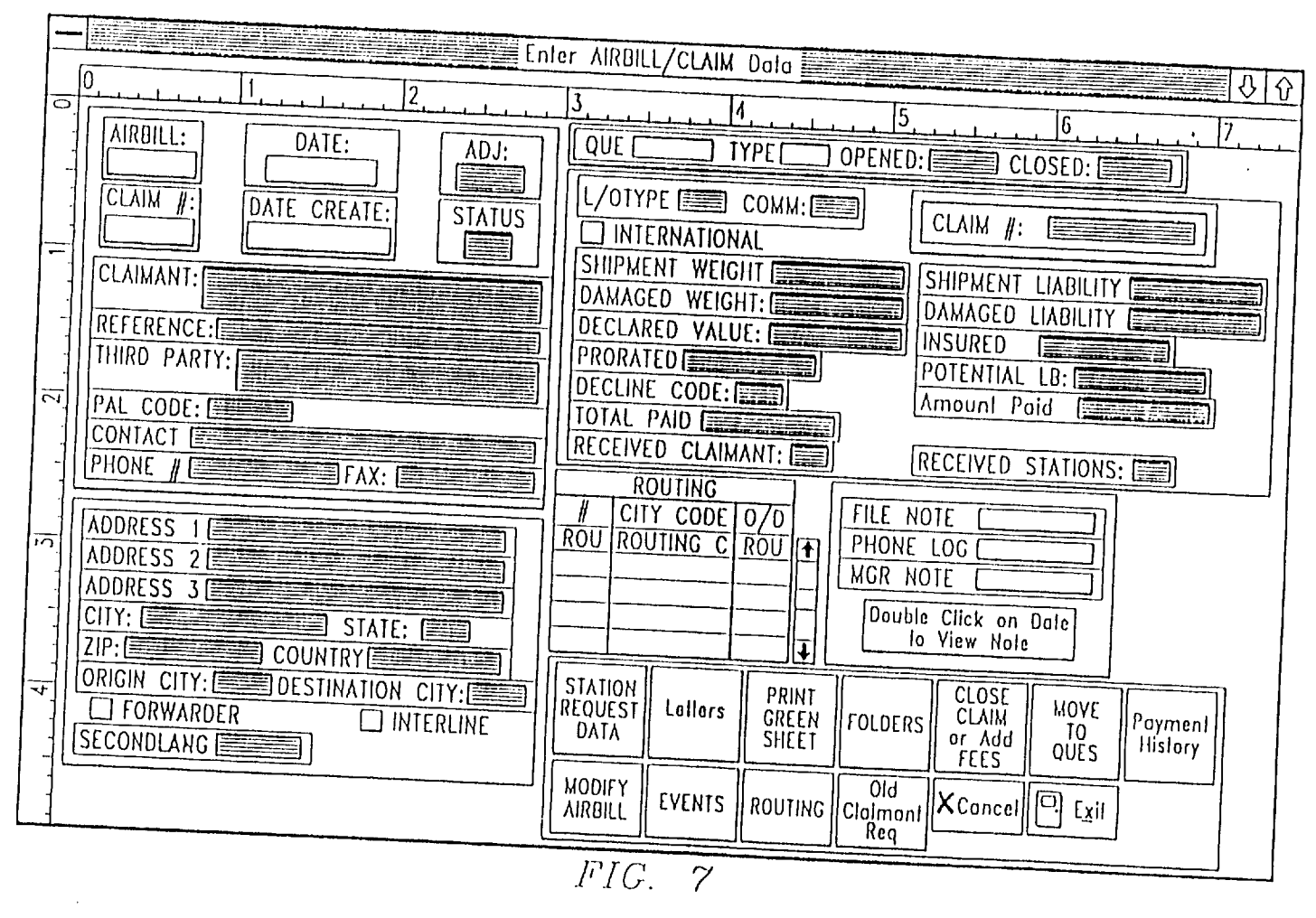

FIG. 7 illustrates one embodiment of a CLAIMS subsystem interface screen that the user accesses on a computer terminal. The CLAIMS subsystem includes a plurality of forms and tables to aid the users in processing a customer's claim folder.

ADJDSKTP.FDL is a form entitled "Adjuster Desktop" contained in the CLAIMS subsystem. This form allows the adjuster to view the scope of their work. They can view the setup queue, the hot list queue, the suspense work queue, the work queue and the other queue. The adjuster brings up the claim maintenance form for the claim by double clicking on an entry. From this form, the adjuster can update the suspense queue entries to the suspense work queue.

ADJNOTES.FDL is a form entitled "Adjuster Notes" contained in the CLAIMS subsystem. This form is used to update the adjusters note field of the airbills table.

ADJUSTER.DB is a table entitled "Adjuster Table" contained in the CLAIMS subsystem. This table contains all of the adjusters in the system. Each record contains that adjuster's password and standard for processing times.

AIRBILLS.DB is a table entitled "Airbills Table" contained in the CLAIMS subsystem. This is the root table for the system. There is usually an air bill record before there is a claim. It is possible to have a preliminary air bill with no claims.

AIRBILLS.FDL is a form entitled "Air bill Maintenance Form" contained in the CLAIMS subsystem. This form allows the user to view and maintain an air bill.

CITYCODE.DB is a table entitled "City Code Table" contained in the CLAIMS subsystem. This table is keyed by the city or station code. It contains branch and station information for report purposes.

CLAIMS.DB is a table entitled "Claims Table" contained in the CLAIMS subsystem. The claims table is a subset of the air bill table. The claims table contains the air bill number plus a count of the number of claims for the air bill.

CLAIMS.FDL is a form entitled "Maintain Claims Record" contained in the CLAIMS subsystem. This is the main form for the claims system. This form allows the user to add data to a claim, request letters or data from a station, route the claim, close the claim, or move the claim to another queue.

COMMCODE.DB is a table entitled "Commodity Code Table" contained in the CLAIMS subsystem. This is a lookup table for the commodity codes.

DECLINCD.DB is a table entitled "Decline Code" contained in the CLAIMS subsystem. This is a lookup table for the decline codes.

EVENTS.FDL is a form entitled "Events Maintenance" contained in the CLAIMS subsystem. The user maintains the events table from this form.

EVNTNOTE.DB is a table entitled "Event Table" contained in the CLAIMS subsystem. This table contains events by station, date and flight. This table is used to store the problems at each company station.

FILENOTE.FDL is a form entitled "File Notes Maintenance" contained in the CLAIMS subsystem. The user utilizes this form to update the file notes field on an air bill.

FOLDERS.DB is a table entitled "Folders Table" contained in the CLAIMS subsystem. This table stores the request of folders by adjuster.

GETABNUM.FDL is a form entitled "Get an Air bill Using AWB/DATE claim #" contained in the CLAIMS subsystem. This dialog box is used to locate an AWB by specifying the air bill only.

GETADJ.FDL is a form entitled "Get Adjuster Dialog" contained in the CLAIMS subsystem. This form is used at various places in the system to select an adjuster.

GETAIRBL.FLD is a form entitled "Get Air bill—Standard Dialog" contained in the CLAIMS subsystem. This standard dialog box is used to get the air bill and date for the locate screen.

GETAIRCL.FDL is a form entitled "Get Air bill and Date and Claim" contained in the CLAIMS subsystem. This dialog box is used to get the air bill and claim number.

GREENSHT.DB is a table entitled "Green Sheet Table" contained in the CLAIMS subsystem. This is a temporary print table for the green sheet system that gets deleted.

GREENSHT.RDL is a report entitled "Report to Print the green sheets" contained in the CLAIMS subsystem. This report prints the green sheet form from the green sheet table.

IMPREST.DB is a table entitled "IMPREST Report Temporary Data Table" contained in the CLAIMS subsystem. This temporary table holds the IMPREST data gathered for printing.

INTRAY.FDL is a form entitled "Input All Documents in the Claims System" contained in the CLAIMS subsystem. This is the form used to enter all new documents into the system. This form will setup an air bill if has not already been set up or will flag and update claims for which claimant data or station data has been received.

LDCODE.DB is a table entitled "Loss and Damage Lookup Table" contained in the CLAIMS subsystem. This is the lookup table for the loss and damage code.

LISTAIRB.FDL is a form entitled "List All Airbills with Different Dates for a AWB Number" contained in the CLAIMS subsystem. This dialog box is viewed prior to the locate screen to verify that there is only one air bill date for the AWB number.

MGRNOTES.FDL is a form entitled "Manager Notes Form" contained in the CLAIMS subsystem. This form is used to maintain the manager notes field of the air bill record.

PALADDRS.DB is a table entitled "P A L Code Table" contained in the CLAIMS subsystem. This is a lookup table for the P A L code.

PHONELOG.FDL is a form entitled "Maintain Phone Notes Fields of the Airbills" contained in the CLAIMS subsystem. This form maintains and updates the phone log note fields in the air bill record.

PHONEOP.FDL is a form entitled "Phone Operator Form" contained in the CLAIMS subsystem. This is the form the claims representative views in order to review and report to claimants the status of the claim over the phones.

PRTALLGN.QBE is a query entitled "Query to Print all Green Sheet Records Unprinted" contained in the CLAIMS subsystem. This query is used to print the green sheets.

PRTNONGN.QBE is a query contained in the CLAIMS subsystem. This query can be used for the printing of green sheets.

QBEFOLD.DB is a table contained in the CLAIMS subsystem. This table can be used to print folder requests.

QCOMPLET.DB is a table entitled "Complete Queue" contained in the CLAIMS subsystem. This queue contains archived claims that have been completed.

QFORMCLM.DB is a table entitled "Queue Formal Claim" contained in the CLAIMS subsystem. This table is the setup queue for all airbills. This table represents the first queue in the claim resolution process.

QHOTLIST.DB is a table entitled "Hot List Queue" contained in the CLAIMS subsystem. The user places claims folders in this queue if the claim needs constant attention.

QOTHER.DB is a table entitled "Other Queue" contained in the CLAIMS subsystem. The INTPAY function places an entry into this table if the INTRAY user is not sure what to do with a document.

QPENDING.DB is a table entitled "Pending Queue" contained in the CLAIMS subsystem. Claim folders are placed in this queue when the claim is waiting on responses from stations or claimants.

QSUSPENC.DB is a table entitled "Suspense Queue" contained in the CLAIMS subsystem. This queue contains claims that have been put on suspense.

QSUSPNWK.DB is a table entitled "Suspense Work Queue" contained in the CLAIMS subsystem. This table contains those claim folders that have been brought out of the suspense queue to be further processed.

QUEDAYS.DB is a table entitled "Queue History Days" contained in the CLAIMS subsystem. This table contains a record of each time a claim folder changes queue along with the number of days that the claim folder stayed in a particular queue. This data is used in the adjuster activity report.

QWORKCLM.DB is a table entitled "Work Queue Table" contained in the CLAIMS subsystem. This queue contains the claim folders that are active and are being further processed.

REQDATCL.DB is a table entitled "Request Data from Claimant" contained in the CLAIMS subsystem. This table lists any requests for data from the claimant. This table is not typically used with the new acknowledgment letters system, but rather contains information for use in the pre-acknowledgment system.

REQSTATN.DB is a table entitled "Request Data from Stations" contained in the CLAIMS subsystem. This table tracks all requests for data from company stations for each claim.

ROUTING.DB is a table entitled "Routing Table" contained in the CLAIMS subsystem. This table contains a record for each station handling a particular air bill. This data is connected to the air bill table.

ROUTING.FDL is a form entitled "Routing Maintenance Form" contained in the CLAIMS subsystem. This form maintains the routing for an air bill to include updating flight number, date and company station. This form also allows an event to be added to the event table.

RPTGREEN.FDL is a form entitled "Printer Control Form to Print the Green Sheets" contained in the CLAIMS subsystem. This is the print control form for printing the green sheets.

RWAIRBIL.FDL is a form entitled "Locate Airbills" contained in the CLAIMS subsystem. This locate air bill screen lists all claims for an air bill. This form can be used to find the claim in order to process it.

RWALFOLD.FDL is a form entitled "Review Requested Folders" contained in the CLAIMS subsystem. This is the print control form for the folder system.

RWCOMPLT.FDL is a form entitled "Review Complete Queue" contained in the CLAIMS subsystem. This form is used to review claims in the Complete Queue (QCOMPLET).

RWEXPLNT.FDL is a form entitled "Review Explanation for the Green Sheets" contained in the CLAIMS subsystem. This screen is used to load closing statements to the green sheets.

RWFOLDER.FDL is a form entitled "Review Folder Request" contained in the CLAIMS subsystem. A user can review folders requested by an adjuster.

RWFORMDT.FDL is a form entitled "Review Formal Claims Queue" contained in the CLAIMS subsystem. This form is used from the adjuster desktop to view all the claims for an adjuster in the setup queue.

RWHOTLST.FDL is a form entitled "Review Hot List Queue for an Adjuster" contained in the CLAIMS subsystem. Used at the adjuster desktop to view all of the hot list claim folders for an adjuster.

RWNAME.FDL is a form entitled "Review All Claims for the Same Name" contained in the CLAIMS subsystem. This form is used to view all of the claims for a particular claimant name.

RWOLDCLM.FDL is a form entitled "View the Claimant Request for Data from the Original System" contained in the CLAIMS subsystem. The user utilizes this form to view the claimant request for data from the original claims management system. This form may eventually be phased out of the system.

RWOTHER.FDL is a form entitled "Review All Claims in the QOTHER Queue" contained in the CLAIMS subsystem. This form is used to review all of the claims in the OTHER QUEUE for an adjuster.

RWPEND.FDL is a form entitled "Review All Records for an Adjuster for Pending" contained in the CLAIMS subsystem. This form allows a user to review all of the records for an adjuster that are in the pending queue. This form also allows an adjuster to change the status of a pending claim folder.

RWSUSPEN.FDL is a form entitled "Review QSUSPENCE Records for an Adjuster" contained in the CLAIMS subsystem. The user can utilize this form to review all claims in the suspense queue for an adjuster.

RWSUSPWK.FDL is a form entitled "Review All Claims in the QSUSPENCE Work Queue" contained in the CLAIMS subsystem. This form allows a user to review the claims in the suspense work queue for an adjuster.

RWWORKDT.FDL is a form entitled "Review Claims in the Work Queue for an Adjuster" contained in the CLAIMS subsystem. This form allows a user to review all claims and their status in the work queue for an adjuster.

SIGNIN.FDL is a form entitled "Sign In and Password Form" contained in the CLAIMS subsystem. This form is called by the main menu form to authorize an adjuster to gain access to the system. This form uses the adjuster table to verify the adjuster's name and password.

Figure 8:
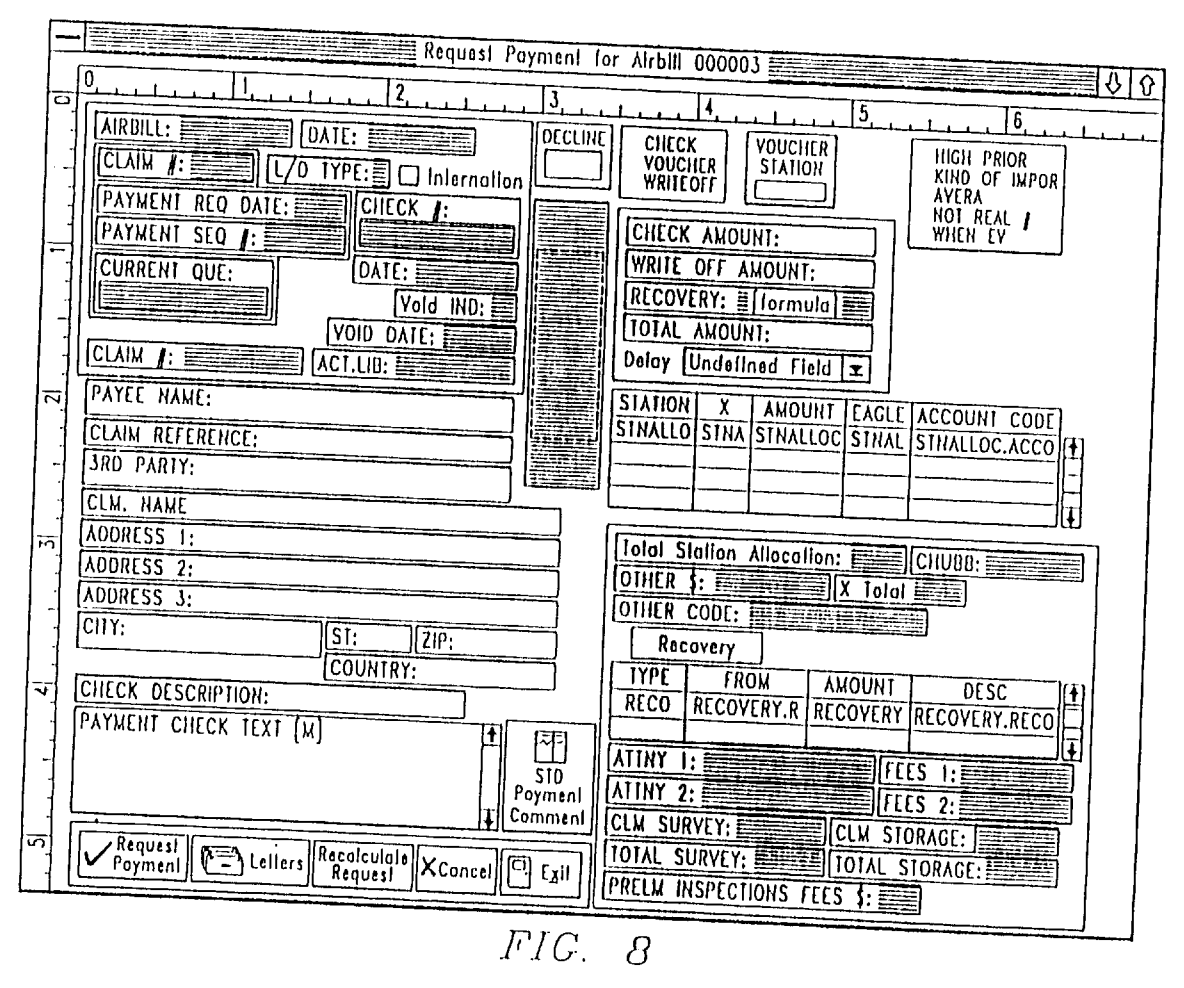

FIG. 8 illustrates one embodiment of a CLOSING subsystem interface screen that the user accesses on a computer terminal. The CLOSING subsystem includes a plurality of forms and tables that are utilized by an adjuster to close out the customer's claim folder.

ATHORIZE.FDL is a form entitled "Authorize Payment Request Records" contained in the CLOSING subsystem. The claims manager uses this form to authorize or decline payment requests from an adjuster. This form either declines the request and places it on to the QDECLINE queue or grants the request and passes it on to the check processing system.

CHUBBAL.DB is a table entitled "CHUBB Insurance Allocation" contained in the CLOSING subsystem. This table contains the allocation of CHUBB insurance payments.

GETPAYRQ.FDL is a form entitled "Get Payment Request" contained in the CLOSING subsystem. The adjuster uses this form to request payment authorization.

PAYMENT.DB is a table entitled "Payment Table" contained in the CLOSING subsystem. This table can be used for all payment requests.

QCHECK.DB is a library entitled "Check Request Queue" contained in the CLOSING subsystem. If a check is authorized, this library is created by the payment authorization form. This library is used to make input to print checks.

QDECLINE.DB is a table entitled "Declined Payment Request Queue" contained in the CLOSING subsystem. This queue table stores declined payment requests from the authorization form.

QREQPAY.DB is a table entitled "Payment Request for Authorization Que" contained in the CLOSING subsystem. This queue contains those payment records that were completed for which a request for payment was submitted.

QVOUCHER.DB is a table entitled "Queue for All Voucher Requested" contained in the CLOSING subsystem. This queue contains a record of the payment requests authorized as vouchers.

RECALLOC.FDL is a form entitled "Recovery Allocation" contained in the CLOSING subsystem. This form maintains a recovery inventory for those payments on which recovery is sought.

RECAWB.RDL is a report entitled "Report of Recovery Record by Air bill" contained in the CLOSING subsystem. This report lists recovery inventory records by air bill.

RECCAPT.RDL is a report entitled "Recovery Records by Capture Date" contained in the CLOSING subsystem. This report list records on the recovery table by recovery date.

RECCHECK.DB is a table entitled "Recovery Incoming Checks" contained in the CLOSING subsystem. This table contains an inventory of all checks received to pay recovery claims.

RECCHUN.QBE is a query entitled "All Recover Inventory that are not Complete" contained in the CLOSING subsystem. A user may utilize this query to find records in the recovery inventory table that have not been completely recovered.

RECCKALL.DB is a table entitled "Recovery Allocated Check Records" contained in the CLOSING subsystem. This is a table of recovery check records that have been allocated.

RECCKUN.RDL is a report entitled "Recovery Checks Unallocated" contained in the CLOSING subsystem. This report includes a list of recovery checks that have been fully allocated.

RECFROM.RDL is a report entitled "Recovery List by Recovery From" contained in the CLOSING subsystem. This report lists uncompleted recovery records by the name of the party from whom recovery is sought.

RECINVEN.DB is a table entitled "Authorized Recovery Records" contained in the CLOSING subsystem. This is a table of all authorized recovery records.

RECOVERY.DB is a table entitled "Recovery" contained in the CLOSING subsystem. This table contains all recovery records whether authorized or unauthorized.

RECUNALL.QBE is a query entitled "Unallocated Recovery Inventory Records" contained in the CLOSING subsystem. This query is used to pull up recovery inventory records that are not fully allocated for reporting purposes.

RECUNALL.RDL is a report entitled "Report Unallocated Recovery Inventory Records" contained in the CLOSING subsystem. This is a report of recovery inventory records.

REQPAY.FDL is a form entitled "Request Payment of Claim" contained in the CLOSING subsystem. This is the main form used to request payment of a claim.

RWDECLIN.FDL is a form entitled "Review Declined Payment Request" contained in the CLOSING subsystem. This form is used by an adjuster to review any payment request denied by a claims manager. From this screen the adjuster can move the request to any queue and go to the claim maintenance screen to rework the claim.

RWPAYMNT.FDL is a form entitled "Review All Request for Payments for a Claim" contained in the CLOSING subsystem. A user can utilize this form from the claims maintenance screen to view, select or begin the request for payment for a claim.

RWREQPAY.FDL is a form entitled "Review Request for Payment Record" contained in the CLOSING subsystem. A manager can use this form to view all of the current requests for payment records.

STNALLOC.DB is a table entitled "Station Allocation Table" contained in the CLOSING subsystem. This table is used to allocate payment request to stations.

STNJOURN.DB is a table entitled "Station Journal Table" contained in the CLOSING subsystem. This is an accounting table that stores authorized transactions by station ID.

WOFFAWBP.RDL is a report entitled "Report of Write Off by Air bill" contained in the CLOSING subsystem. This is a report of write offs by air bill.

WOFFSTNP.RDL is a report entitled "Report of Write Offs by Stations" contained in the CLOSING subsystem. This is a report of current write off records listed by company station.

WOFFTEMP.DB is a table entitled "Write Off Temp Holding Table" contained in the CLOSING subsystem. This is a temporary table of all authorized write offs. This table gets overwritten the each subsequent pull of time write offs.

WRITEOFF.DB is a table entitled "Write Off Table" contained in the CLOSING subsystem. This write off table is updated during the payment request time. As records are authorized, they are marked as authorized. This is a permanent table.

WRITEOFF.FDL is a form entitled "Print Write Off Report" contained in the CLOSING subsystem. The write off report is generated from this data contained in this form.

Figure 9:
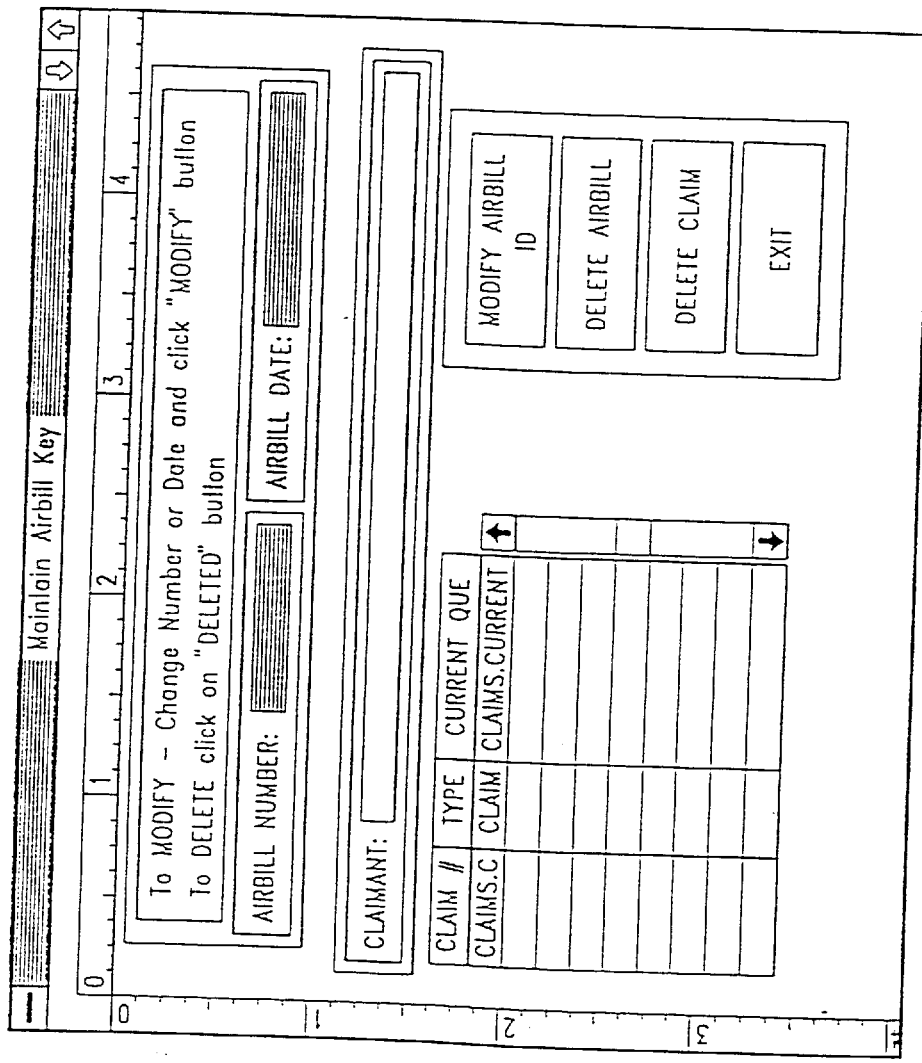
FIG. 9 illustrates an embodiment of the user interface screen provided when accessing the MISC subsystem.

FIG. 9 illustrates one embodiment of a MISC subsystem interface screen that the user accesses on a computer terminal. The MISC subsystem includes a plurality of miscellaneous forms and tables.

CHGAIRBL.FDL is a form entitled "Changes Air bill Number or Date" contained in the MISC subsystem. This form is used to change the AWB number or the date for an air bill, its associated claim, and all supplemental records for the AWB.

CHGWAIT.FDL is a form entitled "Dialog Message Box for Change Air bill ID" contained in the MISC subsystem. This dialog box informs the user to wait while the system is changing air bill number or date and all of its child records.

EZASSIST.FDL is a form entitled "EZDOC Document Table Form" contained in the MISC subsystem. This form is used to produce documentation.

MODAIRBL.FDL is a form entitled "Modify Air bill or Date" contained in the MISC subsystem. This form allows can modify the air bill number or date.

PROBMLOG.DB is a table entitled "Problem Log" contained in the MISC subsystem. This table contains reported problems with the claims management system.

PROBMLOG.FDL is a form entitled "Problem Log" contained in the MISC subsystem. This form is used to report system problems.

SYSCONF.DB is a table entitled "System Configuration Table" contained in the MISC subsystem. The system configuration table contains the department standards.

UTILCLM.FDL is a form entitled "Utility to Change Adjuster IDs" contained in the MISC subsystem. This utility scans the claims table and changes any blank adjuster ID to the adjuster associated with the air bill.

WAITRPT.FDL is a form entitled "Dialog Box to Notify a Report is Being Produced" contained in the MISC subsystem. This dialog box will notify the user to wait while a report is being produced.

WAITSUSP.FDL is a form entitled "Wait While the Suspense File is Being Updated" contained in the MISC subsystem. This form notifies the user to wait while the system finds records on the suspense file that need to be moved to the suspense work queue.

Figure 10:
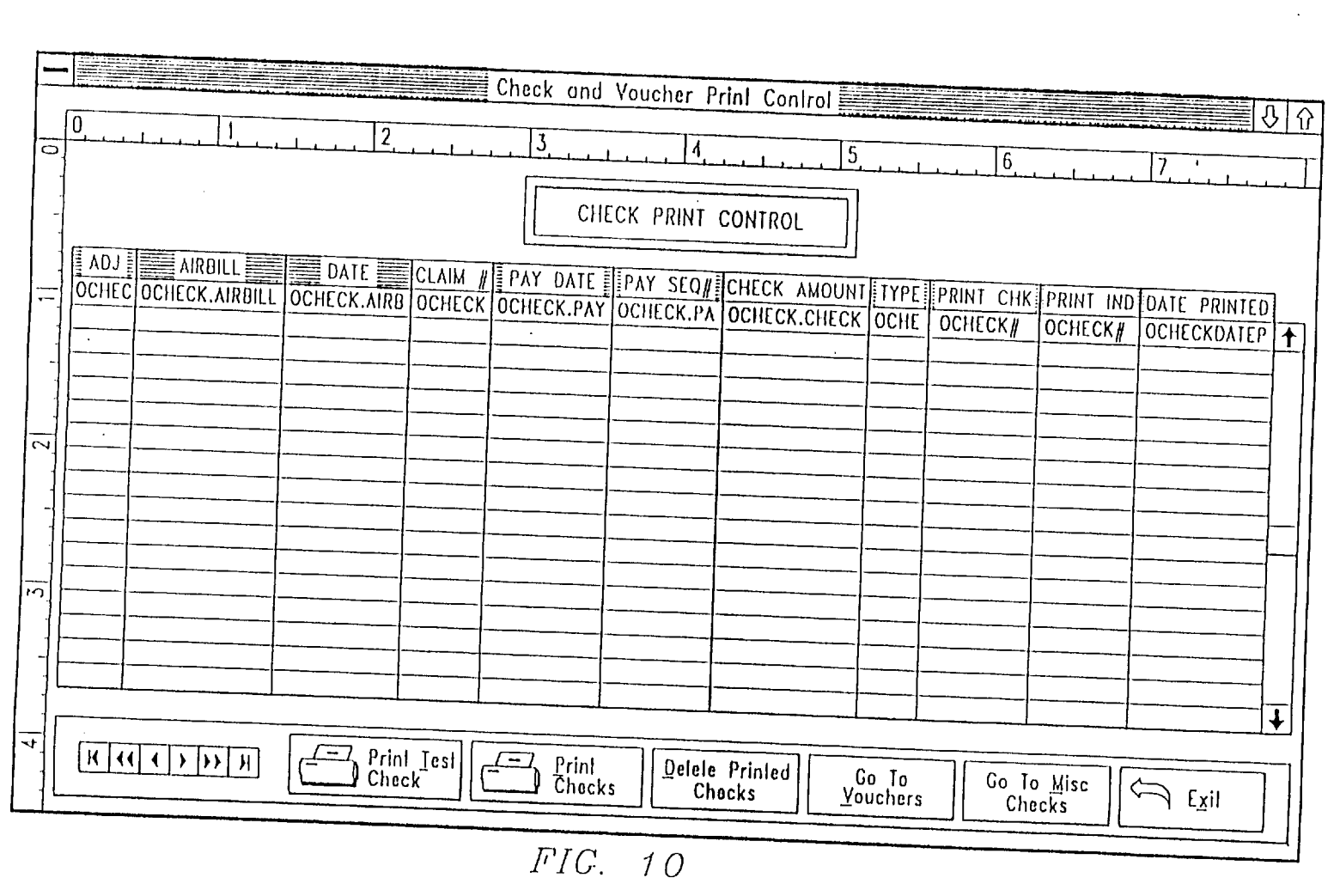

FIG. 10 illustrates one embodiment of a CHECKS subsystem interface screen that the user accesses on a computer terminal. The CHECKS subsystem includes a plurality of forms and tables used to process and record payments of claims to customers.

CHKREG.DB is a table entitled "Check Register" contained in the CHECKS subsystem. This table contains a checkbook-like register of all checks printed including miscellaneous and voided checks.

CHKRGCTL.FDL is a form entitled "Check Register Control" contained in the CHECKS subsystem. This contains a checkbook-like register of all checks printed including miscellaneous and voided checks. Checks can be voided for reprinting or voided completely from this form.

CVPRNCTL.FDL is a form entitled "Check and Voucher Print Control" contained in the CHECKS subsystem. This form controls all printing of checks, vouchers and miscellaneous checks.

MISCAUTH.FDL is a form entitled "Miscellaneous Check Authorization" contained in the CHECKS subsystem. This form allows miscellaneous check approval after the miscellaneous check is entered into the miscellaneous check control form. A miscellaneous check must first be approved on this form before it can be printed.

MISCCHK.DB is a table entitled "Miscellaneous Checks" contained in the CHECKS subsystem. This table holds the miscellaneous checks as they are created and later authorized for printing.

MISCCTRL.FDL is a form entitled "Miscellaneous Check Control" contained in the CHECKS subsystem. Miscellaneous checks are created at this form.

MISCHIST.DB is a table entitled "Miscellaneous Check History" contained in the CHECKS subsystem. This table contains a history of all miscellaneous checks.

MNTADJ.FDL and MNTSYSCF.FDL are forms contained in the CHECKS subsystem. These forms are used to maintain the adjuster table and the system configuration tables respectively. The MNTSYSCF.FDL is used to maintain the system configuration table that contains the system wide performance.

PRNQCHK.DB is a table entitled "Check Print Queue Table" contained in the CHECKS subsystem. This is a temporary table used to hold checks prior to printing. This table is emptied before and after every check printing session.

PRNQCHK.QBE is a query entitled "Populate Check Print Queue" contained in the CHECKS subsystem. This query is used for populating the check print queue table.

PRNQCSTN.DB is a table entitled "Check Station Allocation Print Queue" contained in the CHECKS subsystem. This temporary table holds station data related to each check to be printed. This table is emptied before and after every check printing session. This data is gathered from the station allocation table.

PRNQMISC.DB is a table entitled "Miscellaneous Check Print Queue Table" contained in the CHECKS subsystem. This temporary table holds the miscellaneous checks to be printed. This table is emptied before and after every check printing session.

PRNQMISC.QBE is a query entitled "Populate Miscellaneous Check Print Queue" contained in the CHECKS subsystem. This query is used for populating the miscellaneous check print queue table.

PRNQSTN.DB is a table entitled "Old Table—Delete Me!!" contained in the CHECKS subsystem.

PRNQVCH.DB is a table entitled "Voucher Print Queue Table" contained in the CHECKS subsystem. This temporary table holds vouchers to be printed. This table is emptied before and after every voucher printing session.

PRNQVCH.QBE is a query entitled "Populate Voucher Print Queue" contained in the CHECKS subsystem. This query is used to populate the voucher print queue table.

PRNQVSTN.DB is a table entitled "Voucher Station Allocation Print Queue" contained in the CHECKS subsystem. This temporary table holds station data related to each voucher to be printed. This table is emptied before and after every voucher printing session. This data is gathered from the station allocation table.

QREQVPRN.DB is a table contained in the CHECKS subsystem.

QVCHAUTH.DB is a table entitled "Voucher Authorization Queue Table" contained in the CHECKS subsystem. This table holds the printed vouchers for authorization.

UPDABVCH.QBE is a query entitled "Update Air bill Data from Voucher Authorization" contained in the CHECKS subsystem. This query updates all airbills based on vouchers that were printed and then authorized.

UPDAIRB.QBE is a query entitled "Update Air bill Data from Check Printing" contained in the CHECKS subsystem. This query updates all airbills based on checks that were printed.

UPDCLAIM.QBE is a query entitled "Update Claim Data from Check Printing" contained in the CHECKS subsystem. This query updates all claims based on checks that were printed.

UPDCLVCH.QBE is a query entitled "Update Claim Data from Voucher Authorization" contained in the CHECKS subsystem. This query updates all claims based on vouchers that were printed and then authorized.

UPDVAUTH.QBE is a query entitled "Update Voucher Authorization Queue" contained in the CHECKS subsystem. After vouchers are printed they are queued for authorization. This query places printed vouchers in the voucher authorization queue table.

VCHAUTH.FDL is a form entitled "Voucher Authorization Form" contained in the CHECKS subsystem. Printed vouchers are authorized here.

Figure 11:
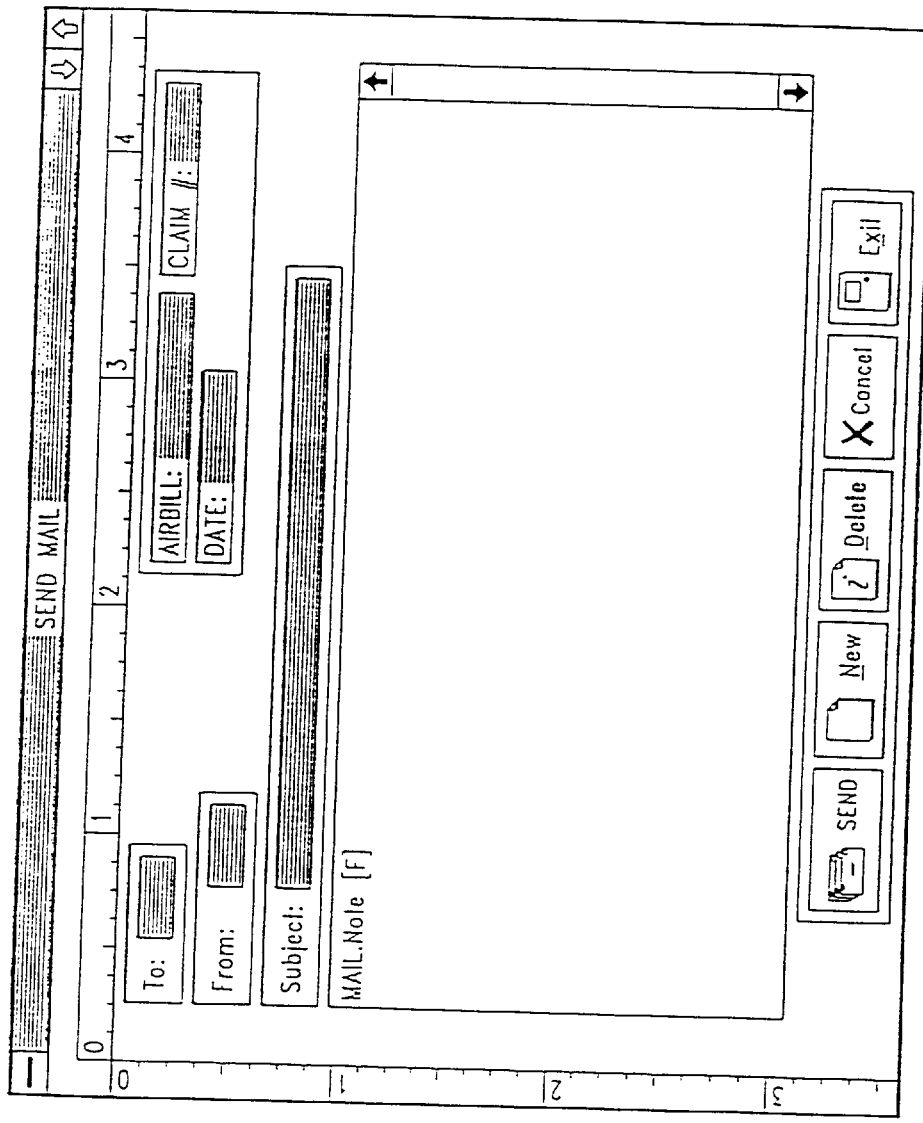
FIG. 11 illustrates an embodiment of the user interface screen provided when accessing the MAIL subsystem.

FIG. 11 illustrates one embodiment of a MAIL subsystem interface screen that the user accesses on a computer terminal. The MAIL subsystem includes a plurality of forms and tables users utilize to communicate informally with other company stations.

MAIL.DB is a table entitled "Mail Table" contained in the MAIL subsystem. This table is used for the internal MAIL system.

MAILREAD.FDL is a form entitled "Form to Read Mail for an Adjuster" contained in the MAIL subsystem. This form is used to read incoming mail in table frame form, rather than detail.

MAILRETN.FDL is a form entitled "Read Detail of Mail" contained in the MAIL subsystem. This form is used to read the detail of a letter and allow's a user to send a return message.

MAILSEND.FDL is a form entitled "Send Mail Form" contained in the MAIL subsystem. This form creates a mail message to send to a member of the system.

MAILTO.FDL is a form entitled "Mail to Dialog Box" contained in the MAIL subsystem. This is a dialog box used to determine what parties mail is being sent to and verify those parties are part of the claims management system.

Figure 12:
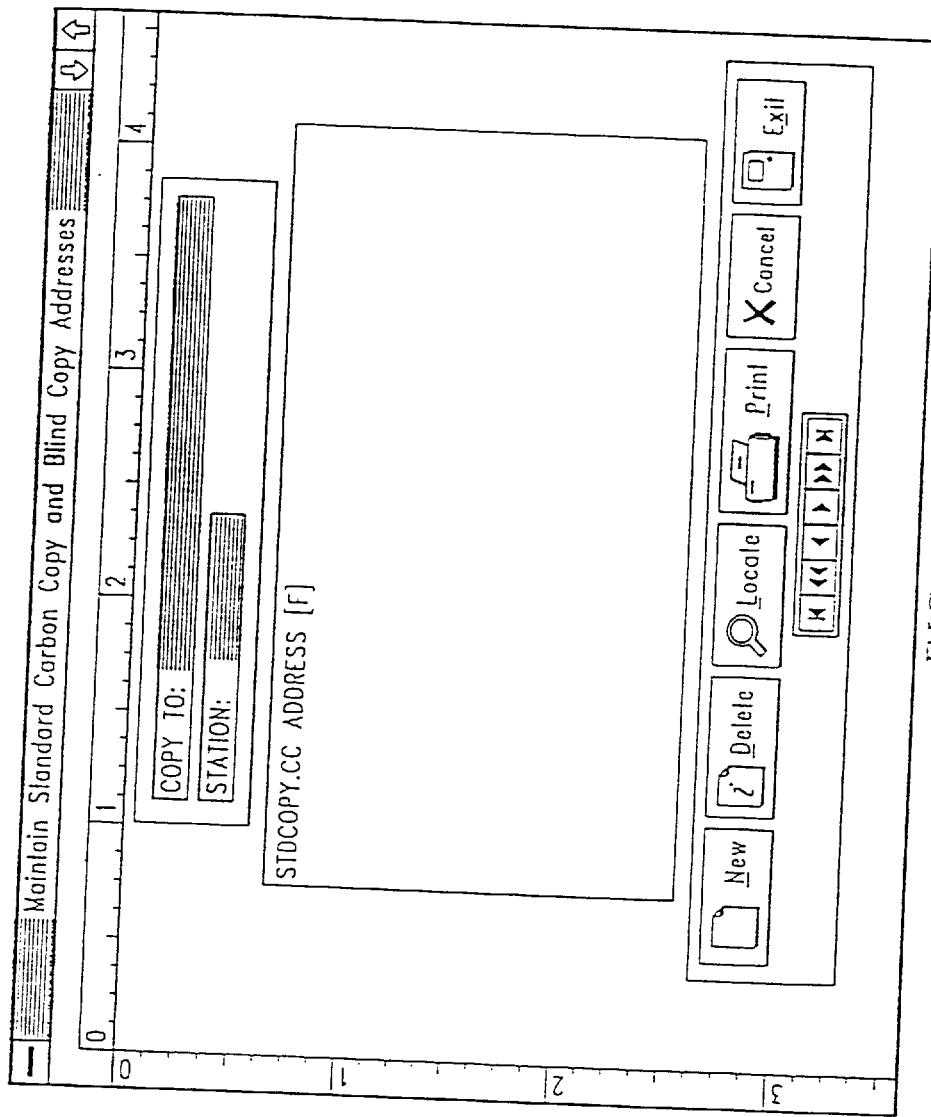
FIG. 12 illustrates an embodiment of the user interface screen provided when accessing the TABLE MAINTENANCE subsystem.

FIG. 12 illustrates one embodiment of a TABLE MAINTENANCE subsystem interface screen that the user accesses on a computer terminal. The TABLE MAINTENANCE subsystem includes a plurality of forms for maintaining various data files in the claims management system.

MNTAMSNM.FDL is a form entitled "Maintain AMS Names and Addresses" contained in the TABLE MAINTENANCE subsystem. This form allows maintenance of the AMS names, addresses and other related data.

MNTCOMD.FDL is a form entitled "Form to Maintain Commodity Code" contained in the TABLE MAINTENANCE subsystem. This form is used to maintain the lookup table commodity code.

MNTCTYCD.FDL is a form entitled "Maintain City Code" contained in the TABLE MAINTENANCE subsystem. This form is used to maintain the city code table.

MNTDECLN.FDL is a form entitled "Maintain Decline Code" contained in the TABLE MAINTENANCE subsystem. This form is used to maintain the decline codes.

MNTFORMS.FDL is a form entitled "Maintain Standard Form Letters Verbage" contained in the TABLE MAINTENANCE subsystem. This form is used to maintain the standard form letters.

MNTLDCOD.FDL is a form entitled "Maintain Loss and Damage Code Table" contained in the TABLE MAINTENANCE subsystem. This form is used to maintain the loss and damage code table.

MNTPHRAS.FDL is a form entitled "Maintain Standard Acknowledgment Letter Phrases" contained in the TABLE MAINTENANCE subsystem. This form is used to maintain the standard phrases for acknowledgment letters.

MNTSTDCP.FDL is a form entitled "Maintain Blind and Carbon Copy Address" contained in the TABLE MAINTENANCE subsystem. This form is used to maintain the addresses for the standard carbon copy and blind copy letters.

Although the present invention has been described in detail, it should be understood that various changes, substitutions and alterations can be made herewith without departing from the spirit and scope of the invention as defined by the appended claims.

What is claimed is:

1. A method for managing cargo claims, said method performed by a computer, comprising the steps of:
   receiving information regarding said cargo claims from an external source;
   organizing said information into a plurality of documents wherein each document is comprised of at least one part of said information;
   indexing said documents into a plurality of folders wherein said folders correspond to individual cargo claims;
   storing said folders in a memory;
   assigning each individual folder to one of a plurality of workflow queues based on the status of the folder; (and)
   allowing a user to perform functions on the plurality of folders in the plurality of workflow queues; and
   permitting movement of said folders from one workflow queue to another workflow queue.

2. The method of claim 1, wherein said step of receiving information regarding said cargo claims includes the substep of receiving information from a user interface wherein said user interface may comprise:
   a scanner to scan information and produce documents; or
   an input devise operable by a user to input information utilizing the input device to create documents; or
   a computer-readable memory operable to input information and create documents.

3. The method of claim 1 wherein said step of indexing said documents into a plurality of folders further includes the substeps of;
   determining if a folder on said claim has previously been created;
   if so, selecting said folder and placing said document into said folder; if not, organizing said documents and creating a folder;
   determining the documents required in a folder;
   comparing documents in a folder to the documents required in a folder for the purpose of determining when said cargo claims are ready to be processed; and
   assigning said folders ready to be processed to an adjuster for further processing.

4. The method of claim 3 wherein said step of indexing said documents into a plurality of folders further includes the substep of classifying said documents and placing them into a designated place on the system.

5. The method of claim 1, wherein said plurality of workflow queues comprises:
   a Setup queue containing folders in the process of being setup for processing;
   a Hot queue containing folders requiring additional attention;
   a Suspense work queue;
   a Suspense queue for storing claims folders for a designated period of time;
   a Work queue for claims folders ready to be further processed;
   a Pending queue for folders awaiting information from an external source;
   a Request Payment queue containing folders for which payment has been requested;
   a Print Check queue containing folders for which payment has been authorized;
   a Complete queue for folders on which payment has been made; and
   an Other queue containing documents that need to be classified.

6. The method of claim 1, wherein said step of allowing a user to perform functions on the plurality of folders in the plurality of workflow queues further includes the substep of allowing a user to utilize a plurality of workstations comprising:
   a process intray workstation
   an adjuster desktop workstation;
   a process work queue workstation;
   a request payment workstation;
   an authorize payment workstation;
   a print check workstation;
   a process recovery workstation; and
   a process write off workstation.

7. The method of claim 1, wherein said step of allowing a user to perform functions on the plurality of folders in the plurality of workflow queues includes the substep of allowing the user to view the folders contained in a workflow queue.

8. The method of claim 1, wherein said step of allowing a user to perform functions on the plurality of folders in the plurality of workflow queues includes the substep of allowing the user to input additional information into said folder.

9. The method of claim 1, wherein said step of allowing a user to perform functions on the plurality of folders in the plurality of workflow queues includes the substep of allowing the user to generate correspondence based on information contained in said folder.

10. The method of claim 9, wherein said step of allowing a user to perform functions on the plurality of folders in the plurality of workflow queues includes the substep of recording requests for information made in said correspondence in the folder.

11. The method of claim 1, wherein said step of allowing a user to perform functions on the plurality of folders in the plurality of workflow queues includes the substep of allowing a user to request a physical copy of the information contained within said folder.

12. The method of claim 1, wherein said step of allowing a user to perform functions on the plurality of folders in the plurality of workflow queues includes the substep of allowing a user to request additional information from external sources.

13. The method of claim 1, wherein said step of allowing a user to perform functions on the plurality of folders in the plurality of workflow queues includes the substep of allowing a user to review part or all of the contents of a folder.

14. The method of claim 1, wherein said step of allowing a user to perform functions on the plurality of folders in the plurality of workflow queues includes the substep of allowing a user to request additional information from a company station.

15. The method of claim 1, wherein said step of allowing a user to perform functions on the plurality of folders in the plurality of workflow queues includes the substep of allowing a user to calculate the potential liability of a claim.

16. The method of claim 1, wherein said step of allowing a user to perform functions on the plurality of folders in the plurality of workflow queues includes the substep of allowing a user close a folder by denying a claim.

17. The method of claim 1, wherein said step of allowing a user to perform functions on the plurality of folders in the plurality of workflow queues includes the substep of allowing a user to request payment of a claim in whole or in part.

18. The method of claim 17, wherein said step of allowing a user to request payment of a claim in whole or in part includes the substep of allowing a user to assess liability for the claim to an outside party for recovery processing.

19. The method of claim 1, wherein said step of allowing a user to perform functions on the plurality of folders in the plurality of workflow queues includes the substep of allowing a user to authorize or deny payment of a claim.

20. The method of claim 1, wherein said step of allowing a user to perform functions on the plurality of folders in the plurality of workflow queues includes the substep of allowing a user to print payment forms.

21. The method of claim 20, wherein the print payment forms include checks and vouchers.

22. The method of claim 1, wherein said step of allowing a user to perform functions on the plurality of folders in the plurality of workflow queues includes the substep of allowing a user to assess liability for claims to company stations.

23. The method of claim 1, wherein said step of allowing a user to perform functions on the plurality of folders in the plurality of workflow queues includes the substep of allowing a user to write off a claim to a customer's account or credit a customer's credit card.

24. The method of claim 1, further comprising the step of generating accounting reports.

25. The method of claim 1, further comprising the step of calculating the amount of time each folder remained in each workflow queue.

26. The method of claim 1 further comprising the steps of;
calculating the amount of time said folders remained in each workflow queue;
calculating an average amount of time a folder remains in each workflow queue; and
comparing the amount of time a folder remained in any workflow queue to the average amount of time said folders remained in the same workflow queue.

27. The method of claim 1 further comprising the step of printing a paper copy of any data contained within said folders.

28. The method of claim 1, further comprising the step of maintaining an inventory of debits and credits chargeable to external parties in a recovery facility.

29. The method of claim 28, wherein said step of maintaining an inventory of debits and credits further includes the substeps of
assessing liability for said claims for which payment was authorized;
creating an inventory of all authorized payments for which liability is assessable to an outside company;
tracking all payments made by said outside companies; and
creating a report from said inventory.

30. A computer-readable memory configured to represent a computer program for directing a computer to manage cargo claims for:
organizing received information into documents comprised of at least one part of said received information;
indexing said documents into a plurality of folders wherein said folders correspond to individual cargo claims;
storing said folders in a memory;
assigning each individual folder to one of a plurality of workflow queues based on the status of the folder;
allowing a user to perform functions on the plurality of folders in the plurality of workflow queues; and
permitting movement of said folders from one workfow queue to another workflow queue.

31. A system to manage cargo claims directed by a computer program to manage cargo claims, the system comprising:
a memory operable to store a computer program, information input from a variety of external sources concerning the claims, information in a plurality of workflow queues, and information contained within a plurality of folders;
a processor coupled to the memory operable to execute said computer program for:
organizing said information into documents comprised of at least one part of said information;
indexing said documents into a plurality of folders wherein said folders correspond to individual cargo claims;
storing said folders in said memory;
assigning each individual folder to one of a plurality of workflow queues based on the status of the folder;
allowing a user to perform functions on any of the plurality of folders in the plurality of workflow queues; and
permitting movement of said folders from one workfow queue to another workflow queue; and
an input output device coupled to the processor providing an interface allowing the input of information pertaining to said cargo claims into said system.

* * * * *

UNITED STATES PATENT AND TRADEMARK OFFICE
CERTIFICATE OF CORRECTION

PATENT NO. : 5,870,711
DATED : February 9, 1999
INVENTOR(S) : Huffman

It is certified that error appears in the above-indentified patent and that said Letters Patent is hereby corrected as shown below:

Claim 1, col. 21, line 27, delete "[and]".

Claim 2, col. 21, line 39, "devise" should read --device--.

Claim 4, col. 21, line 65, "setup" should read --set up--.

Claim 26, col. 23, line 41, "of;" should read --of:--.

Claim 30, col. 24, line 25, "workfow" should read --workflow--.

Claim 31, col. 24, line 48, "workfow" should read --workflow--.

Signed and Sealed this

First Day of June, 1999

*Attest:*

Q. TODD DICKINSON

*Attesting Officer*  *Acting Commissioner of Patents and Trademarks*